Sept. 11, 1973  R. J. WEBER  3,758,278
INTERNAL COMBUSTION ENGINE EXHAUST GAS
EMISSION CONTROL APPARATUS
Filed Feb. 22, 1972

3,758,278
INTERNAL COMBUSTION ENGINE EXHAUST GAS
EMISSION CONTROL APPARATUS
Rainer Jorg Weber, Hessenring, Germany, assignor to
General Motors Corporation, Detroit, Mich.
Filed Feb. 22, 1972, Ser. No. 228,074
Claims priority, application Germany, Mar. 12, 1971,
P 21 11 906.2
Int. Cl. B01j 9/04; F01n 3/14
U.S. Cl. 23—288 F                   4 Claims

ABSTRACT OF THE DISCLOSURE

A valve unit controls the flow of exhaust gases either directly to a catalytic converter or indirectly through a cooling loop to a catalytic converter and includes a pair of parallel tangentially disposed conduits. The inlet of one conduit receives exhaust gases from the engine, the outlet of the other conduit discharges exhaust gases to the converter, and a cooling loop connects the outlet of the one conduit to the inlet of the other conduit. An opening in the partition between the conduits joins the conduits intermediate their inlets and outlets. A valve member controls flow to alternatively direct exhaust flow either from the inlet of the one conduit to its outlet and through the cooling loop or from the inlet of the one conduit through the opening to the outlet of the other conduit.

---

This invention relates to internal combustion engine exhaust emission control systems, and in particular to exhaust emission control systems employing a catalytic converter in which the exhaust gases are thermally reacted under the action of the catalyst, generally with additionally introduced air, in order to remove or reduce the harmful constituents of the exhaust gases.

In such systems it is important that the catalytic reaction of the exhaust gases should be fully initiated very shortly after the engine is started because it is during the first few minutes after starting up, when the engine is still relatively cool, that the exhaust gases contain a particularly high proportion of undesirable constituents. On the other hand, the catalyst should also be capable of functioning when the engine has reached its normal operating condition, in which the exhaust gases may have a temperature of about 1000° C. These two conflicting requirements of the catalyst for the thermal reaction of the exhaust gases are difficult to fulfill.

It has been proposed that, in an exhaust emission control system employing a catalytic converter, a cooling unit be located in the exhaust conduit between the engine and the catalytic converter. At high exhaust gas temperatures the exhaust gases are cooled by the cooling unit, whereas when the exhaust gases are still relatively cold, during starting of the engine, the exhaust gases pass into the catalytic converter substantially uncooled.

In accordance with the invention, the by-passing of the exhaust gases can be effected simply and advantageously by a gas diverter valve which is controllable in accordance with exhaust gas temperature, for example, and is arranged in the exhaust pipe upstream of the point at which it branches into the cooling unit so that, after the attainment of a temperature in the catalytic converter of about 800° C., the exhaust gases are directed by the diverter valve through the cooling unit. The control of the gas diverter valve in accordance with temperature can be effected in known manner, preferably through a thermostatic spring.

The cooling unit may be readily and inexpensively formed as a branch pipe which is led back in a loop to the exhaust pipe. As soon as the exhaust gases have reached a predetermined temperature they are by-passed through the looped branch pipe where they are cooled to such an extent that they enter the catalytic converter at a temperature which is favourable for the efficiency and durability of the catalyst. It is also possible to provide a plurality of looped branch pipes and to shape these as required in accordance with space conditions. Preferably however, the branch pipe is formed as a single oval loop. A simple diversion of the exhaust gases through the diversion valve can be effected by arranging the branch and return connections of the branch pipe adjacent each other at the same level as the exhaust pipe. The construction is simplified by forming the branch and return connections, as well as the thermostatically controlled diverter valve, in an insert which is preferably cast and which is interposed in the exhaust pipe, the exhaust pipe and the branch pipe being connected to the insert by flanges on each The scope of the invention is defined by the appended claims; and the invention and the method by which it is to be performed are hereinafter particularly described with reference to the accompanying drawings in which:

Figure 2:
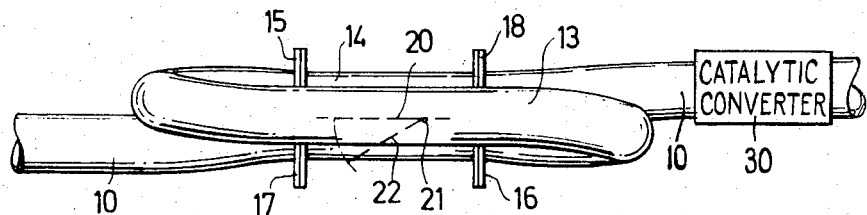
FIG. 2 is a plan of FIG. 1.
Figure 3:
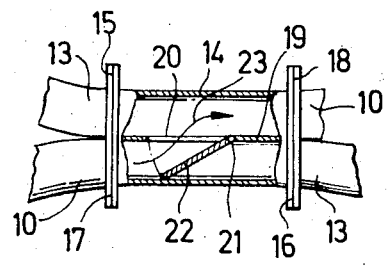
FIG. 3 is a partial section on the line 3—3 of FIG. 1.
Figure 4:
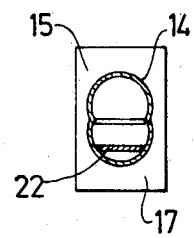
FIG. 4 is a section, rotated through 90°, on the line 4—4 of FIG. 1.

The drawings show an internal combustion engine exhaust emission control system in which the exhaust gases coming from the engine (not shown) pass through an exhaust pipe 10 in the direction indicated by the arrow 11. A cooling unit 12 is interposed in the exhaust pipe 10 between the inlet end thereof and a catalytic converter 30 into which the exhaust pipe 10 leads. The cooling unit 12 consists of a branch pipe 13 which is bent into a loop and is connected by flanges 15, 16 to a cast intermediate connector member 14. The connector member 14 is similarly connected to the exhaust pipe 10 by means of flanges 17, 18 (FIG. 2). As shown in FIG. 3, the connector member 14 has an internal partition 19 with an aperture 20 therein closable by a gas diverter valve flap 22 which is hinged to the partition 19 at 21.

Figure 1:
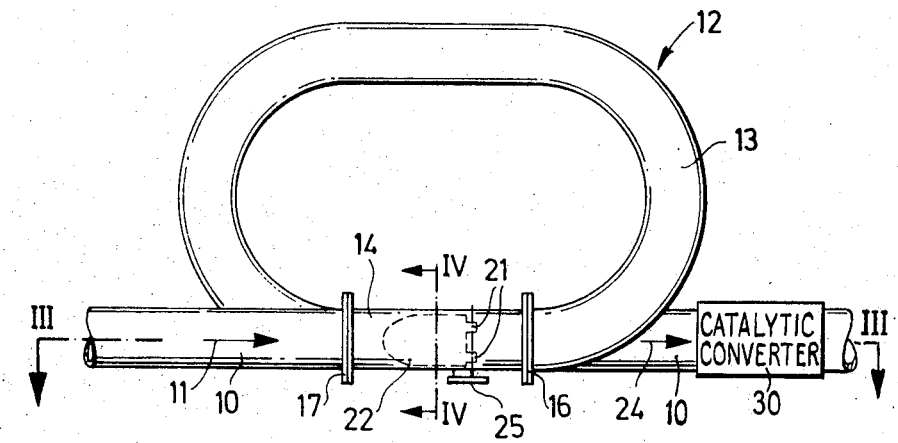
FIG. 1 is an elevation of an exhaust emission control system with an exhaust gas cooling unit according to the invention.

With the diverter valve flap 22 in the closed position, exhaust gas from the inlet end of the exhaust pipe 10 is able to pass around the looped branch pipe 13 where it is cooled and then returns into the exhaust pipe 10. The cooled exhaust gas then passes in the direction of the arrow 24 (FIG. 1) to the catalytic converter 30 which is shown diagrammatically only, as its construction will be well understood by those skilled in the art.

Operation of the diverter valve flap 22 may be effected by a thermo-responsive spring 25 (FIG. 1) in accordance with the temperature of the exhaust gas. When the engine is started up, the exhaust gas is still relatively cold and need not therefore flow through the cooling unit 12. In this operative state of the engine, the diverter valve flap 22 opens the aperture 20 and the exhaust gases pass directly through the aperture 20, as indicated by the arrow 23 in FIG. 3, and into the part of the exhaust pipe 10 which continues from the connector member 14 and from thence towards the catalytic converter 30 where thermal reaction takes place under the action of the catalyst, FIGS. 2 and 3 show the diverter valve flap 22 in this open position.

The thermo-responsive spring 25 is adjusted so that, when the temperature in the converter is about 800° C. it operates to close the aperture 20 and thus compel the hot exhaust gas to follow a by-pass path through the cooling branch pipe 13.

With the construction described above the exhaust gas, irrespective of the operating condition of the engine, always enters the catalytic converter at a temperature which is favourable for the efficient use and durability of the catalyst.

I claim:

1. In an internal combustion engine exhaust gas emission control apparatus including an exhaust pipe having a first portion receiving exhaust gases from an engine and a second portion delivering exhaust gases to a catalytic converter: a cooling loop having an inlet for receiving exhaust gases from said first portion of said exhaust pipe and an outlet for delivering exhaust gases to said second portion of said exhaust pipe, said cooling loop being effective to cool exhaust gas flow therethrough, and a selectively operable valve unit for alternatively directing exhaust gases from said first portion of said exhaust pipe either directly to said second portion of said exhaust pipe or indirectly through said cooling loop to said second portion of said exhaust pipe, said valve unit comprising a pair of parallel, tangentially disposed conduits, one of said conduits having an inlet receiving exhaust gases from said first portion of said exhaust pipe and an outlet discharging exhaust gases to said cooling loop inlet, the other of said conduits having an inlet receiving exhaust gases from said cooling loop outlet and an outlet discharging exhaust gases to said second portion of said exhaust pipe, said valve unit having an aperture opening from said first conduit intermediate its inlet and outlet to said second conduit intermediate its inlet and outlet, said aperture permitting flow of exhaust gas directly from said first conduit inlet to said second conduit outlet, said valve unit further comprising a valve member associated with said opening for alternatively directly flow of exhaust gases from said first conduit inlet either through said first conduit outlet to said cooling loop and thus indirectly to said second portion of said exhaust pipe or through said aperture and said second conduit outlet directly to said second portion of said exhaust pipe.

2. The combination of claim 1 wherein said valve unit comprises a casting defining said conduits and having a partition between said conduits defining said aperture.

3. The combination of claim 1 which further includes temperature responsive means for operating said valve member.

4. The combination of claim 3 wherein said temperature responsive means operates said valve member to deliver exhaust gases through said cooling loop at normal exhaust system operating temperatures and to deliver exhaust gases directly from said first portion of said exhaust pipe to said second portion of said exhaust pipe at low exhaust system operating temperatures.

References Cited
UNITED STATES PATENTS

| | | | |
|---|---|---|---|
| 3,050,935 | 8/1962 | Eastwood | 23—288 F |
| 3,168,806 | 2/1965 | Calvert | 60—286 X |
| 3,197,287 | 7/1965 | Ennes et al. | 23—288 F |
| 3,226,206 | 12/1965 | Hettich et al. | 23—288 F |
| 3,295,919 | 1/1967 | Henderson et al. | 23—288 F X |
| 3,716,344 | 2/1973 | Ashburn | 23—288 F |

BARRY S. RICHMAN, Primary Examiner

U.S. Cl. X.R.

23—288 H; 60—286, 298